US012711473B2

(12) United States Patent
Wright et al.

(10) Patent No.: US 12,711,473 B2
(45) Date of Patent: Aug. 18, 2026

(54) BLOCKCHAIN-IMPLEMENTED SYSTEM AND METHOD

(71) Applicant: nChain Licensing AG, Zug (CH)

(72) Inventors: Craig Steven Wright, London (GB); Stephane Savanah, London (GB)

(73) Assignee: NCHAIN LICENSING AG, Zug (CH)

( * ) Notice: Subject to any disclaimer, the term of this patent is extended or adjusted under 35 U.S.C. 154(b) by 530 days.

(21) Appl. No.: 16/320,987

(22) PCT Filed: Jul. 21, 2017

(86) PCT No.: PCT/IB2017/054425
§ 371 (c)(1),
(2) Date: Jan. 25, 2019

(87) PCT Pub. No.: WO2018/020372
PCT Pub. Date: Feb. 1, 2018

(65) Prior Publication Data

US 2019/0164138 A1 May 30, 2019

(30) Foreign Application Priority Data

Jul. 29, 2016 (GB) ..................................... 1613174

(51) Int. Cl.
*G06Q 20/06* (2012.01)
*G06F 9/54* (2006.01)
(Continued)

(52) U.S. Cl.
CPC ........... *G06Q 20/065* (2013.01); *G06F 9/542* (2013.01); *H04L 9/0637* (2013.01);
(Continued)

(58) Field of Classification Search
CPC ... G06Q 20/065; H04L 9/0643; H04L 9/0825; H04L 9/3226; H04L 9/3247
See application file for complete search history.

(56) References Cited

U.S. PATENT DOCUMENTS 8,296,232 B2 * 10/2012 Tullis ..................... G06Q 40/02 705/39
8,468,244 B2 * 6/2013 Redlich .................. G06Q 50/18 715/255

(Continued)

FOREIGN PATENT DOCUMENTS

EP 3 259 725 B1 * 10/2020 ............. G06Q 20/38
EP 3610368 B1 * 1/2026 ............. G06F 9/466

(Continued)

OTHER PUBLICATIONS

Clark, J., et al. "Financial Cryptography and Data Security," (Feb. 2016) Revised Selected Papers; Heilman, E., et al. "Blindly Signed Contracts: Anonymous On-Blockchain and Off-Blockchain Bitcoin Transactions" (Year: 2016).*

(Continued)

*Primary Examiner* — Daniel S Felten
(74) *Attorney, Agent, or Firm* — Tarolli, Sundheim, Covell & Tummino LLP

(57) ABSTRACT

The invention provides a novel and advantageous method and corresponding system. The invention is implemented via a distributed electronic ledge (blockchain). This may or may not be the Bitcoin blockchain. The invention is suited for the exchange or transfer of an asset, e.g. a digital asset, such as tickets and the like (but not limited in this regard). A n embodiment may provide a computer-implemented method for transferring an asset between a first user and a second user via a blockchain, the method comprising: generating a first blockchain transaction comprising at least one first output, representing at least one first asset, redeemable by providing either: (i) unlocking data; or (ii) a cryptographic signature of the first user and a cryptographic signature of a second user, wherein the at least one first asset is exchanged for at least one second asset represented by a t least one second output of a second blockchain transaction, (Continued)

| | | | |
|---|---|---|---|
| Transaction identifier | | | Tx1 |
| Version number | | | |
| Number of inputs | | | 1 |
| Input (unlocking) | Previous transaction | Hash | Previous Tx |
| | | Output index | |
| | Length of signature script | | |
| | Signature script | | <Alice's signature> <Alice's public key> |
| | SIGHASH flag | | SIGHASH_ALL |
| | Sequence number | | |
| Number of outputs | | | 1 |
| Output (locking) | Value | | 2 |
| | Length of public key script | | |
| | Public key script | | OP_IF<br>OP_HASH160 <hash160(*X*)> OP_EQUALVERIFY OP_DUP<br>OP_HASH160 <hash160(Bob's public key)><br>OP_EQUALVERIFY OP_CHECKSIG<br>OP_ELSE<br>OP_2 <Alice's public key> <Bob's public key><br>OP_2 OP_CHECKMULTISIG<br>OP_ENDIF |
| Locktime | | | |

| | |
|---|---|
| Unlocking script | <Bob's signature> <Bob's public key> <*X*> OP_1 |

| | |
|---|---|
| Unlocking script | <Alice's signature> <Bob's signature> OP_0 |

the at least one second output redeemable by providing either: (i) the unlocking data; or (ii) the cryptographic signature of the first user and the cryptographic signature of the second user, and wherein redemption of at least one second output by providing the first unlocking data makes the first unlocking data available to redeem at least one first output. The unlocking data may the unlocking data comprise revealable data which is chosen by the first user and is initially kept secret or unknown to the second user. Redemption of a third transaction causes the revealable data to become publicly available via the blockchain and thus known to the second user, who can use it in another unlocking script.

12 Claims, 6 Drawing Sheets

(51) Int. Cl.
*H04L 9/00* (2022.01)
*H04L 9/06* (2006.01)
*H04L 9/08* (2006.01)
*H04L 9/32* (2006.01)

(52) U.S. Cl.
CPC .......... *H04L 9/0643* (2013.01); *H04L 9/0825* (2013.01); *H04L 9/3226* (2013.01); *H04L 9/3247* (2013.01); *H04L 9/3297* (2013.01); *H04L 9/50* (2022.05); *H04L 2209/56* (2013.01)

(56) References Cited

U.S. PATENT DOCUMENTS 8,626,656 B2* 1/2014 Abrams, Jr. .......... G06Q 20/042 705/41
8,948,399 B2* 2/2015 Sabin .................... H04L 9/0891 380/282
9,350,550 B2* 5/2016 Nix ....................... H04L 9/0861
9,836,790 B2* 12/2017 Ronca .................... G06Q 40/04
10,050,779 B2 8/2018 Alness et al.
10,121,215 B2* 11/2018 Branscomb .......... G06Q 50/167
10,127,552 B2* 11/2018 Ronca ................... H04L 9/0894
10,255,600 B2* 4/2019 Ronca ..................... H04L 67/12
10,373,129 B1* 8/2019 James .................... H04L 9/3247
10,402,792 B2* 9/2019 Lin ................ G06Q 10/063114
10,999,276 B2* 5/2021 Umezurike ......... H04L 63/0876
11,080,700 B2* 8/2021 Ortiz .................... G06Q 20/023
11,182,781 B2* 11/2021 Castinado ............... H04L 9/321
11,270,298 B2* 3/2022 Pauker ............... G06Q 20/3678
11,501,389 B2* 11/2022 Forbes, Jr. ............. G06Q 10/00
11,695,567 B2* 7/2023 Chan ..................... H04L 9/3239 713/176
2014/0250003 A1* 9/2014 Levchin ................. G06Q 20/02 705/41
2015/0324789 A1 11/2015 Dvorak et al.
2015/0363773 A1* 12/2015 Ronca .................... G06Q 40/02 705/71
2015/0379510 A1* 12/2015 Smith ..................... G06F 21/64 705/71
2016/0092988 A1* 3/2016 Letourneau .......... G06Q 20/223 705/66
2016/0210626 A1* 7/2016 Ortiz .................... G06Q 20/227
2016/0330034 A1 11/2016 Back et al.
2019/0149337 A1* 5/2019 Savanah ............ G06Q 20/3678 713/168
2019/0156301 A1* 5/2019 Bentov ................. H04L 9/0897
2019/0164138 A1* 5/2019 Wright .................. H04L 9/3247
2019/0164221 A1* 5/2019 Hill .................... G06Q 20/3825
2019/0288844 A1* 9/2019 Cassin .................. H04L 9/3213
2020/0059470 A1* 2/2020 Umezurike ......... H04L 63/0823
2020/0074450 A1* 3/2020 Fletcher ................. G06Q 20/36
2023/0370283 A1* 11/2023 Chan ..................... H04L 9/3239

FOREIGN PATENT DOCUMENTS

EP 4675972 A2 * 1/2026 ............. G06F 9/466
GB 2533340 A 6/2016
WO 2015171580 A1 11/2015
WO WO-2018020375 A1 * 2/2018 ............. H04L 63/10

OTHER PUBLICATIONS

OECD Blockchain Primer (Year: 2016).*
Singh, S., and Singh, N., “Blockchain: Future of Financial and Cyber Security”, (Year: 2016).*
Antonopoulos, “Mastering Bitcoin—Unlocking Digital Cryptocurrencies,” O'Reilly Media, Inc., Dec. 20, 2014, 282 pages.
Bitcoin Wiki, “Contract,” retrieved from https://en.bitcoin.it/wiki/Contract, Jan. 5, 2017, 12 pages.
Bitfury, “Digital Assets on Public Blockchains,” retrieved from http://bitfury.com/content/5-white-papers-research/bitfurydigital_assets_on_public_blockchains-1.pdf, Mar. 15, 2016, 37 pages.
Extended European Search Report for Application No. 21168305.7, dated Sep. 28, 2021, 6 pages.
International Search Report and Written Opinion for Patent Application No. PCT/IB2017/054425, mailed Oct. 11, 2017, filed Jul. 21, 2017, 11 pages.
Jtimon et al., “Smart property and stock shares (contracts use case),” Bitcoin Forum, https://bitcointalk.org/index.php?topic-46834.0, Oct. 4, 2011 [retrieved Mar. 7, 2019], 5 pages.
McCorry et al., “Towards Bitcoin Payment Networks,” Australasian Conference on Information Security and Privacy, Jul. 4, 2016, 20 pages.
Mike et al., “Contract,” Bitcoin Wiki, https://en.bitcoin.it/wiki/Contract, Aug. 10, 2017 [retrieved Feb. 5, 2018], 13 pages.
Nakamoto, “Bitcoin: A Peer-to-Peer Electronic Cash System,” Bitcoin, Oct. 31, 2008, https://bitcoin.org/bitcoin.pdf, 9 pages.
Nolan, “Alt Chains and Atomic Transfers,” Bitcoin Forum, retrieved from https://bitcointalk.org/index.php?topic=193281.msg2224949, May 2013, 12 pages.
Satoshi et al., “Connection Limits,” Bitcoin Forum, Aug. 9, 2010, https://bitcointalk.org/index.php?topic=741.0;prev_next=prev, 2 pages.
UK Commercial Search Report mailed Jan. 3, 2017, Patent Application No. GB1613174.0, 5 pages.
UK IPO Search Report mailed Jan. 30, 2017, Patent Application No. GB1613174.0, 4 pages.
Bitfury Group, “Digital Assets on Public Blockchains”, White Paper, Mar. 15, 2016, 37 pages.
Bitfury: “Digital Assets on Public Blockchains,” Mar. 15, 2016, 38 pages.
McCorry et al.: “Towards Bitcoin Payment Networks,” 2016, 22 pages.
Anonmyous: “Alt chains and atomic transfers.” 2016, 16 pages.

* cited by examiner

Figure 1

| | | | |
|---|---|---|---|
| Transaction identifier | | | Tx1 |
| Version number | | | |
| Number of inputs | | | 1 |
| Input (unlocking) | Previous transaction | Hash | Previous Tx |
| | | Output index | |
| | Length of signature script | | |
| | Signature script | | <Alice’s signature> <Alice’s public key> |
| | SIGHASH flag | | SIGHASH_ALL |
| | Sequence number | | |
| Number of outputs | | | 1 |
| Output (locking) | Value | | *2* |
| | Length of public key script | | |
| | Public key script | | OP_IF<br>OP_HASH160 <hash160(*X*)> OP_EQUALVERIFY OP_DUP<br>OP_HASH160 <hash160(Bob’s public key)><br>OP_EQUALVERIFY OP_CHECKSIG<br>OP_ELSE<br>OP_2 <Alice’s public key> <Bob’s public key><br>OP_2 OP_CHECKMULTISIG<br>OP_ENDIF |
| Locktime | | | |

| | |
|---|---|
| Unlocking script | <Bob’s signature> <Bob’s public key> <*X*> OP_1 |

| | |
|---|---|
| Unlocking script | <Alice’s signature> <Bob’s signature> OP_0 |

Figure 2

| | | | |
|---|---|---|---|
| Transaction identifier | | | Tx3 |
| Version number | | | |
| Number of inputs | | | 1 |
| Input (unlocking) | Previous transaction | Hash | Previous Tx |
| | | Output index | 0 |
| | Length of signature script | | |
| | Signature script | | <Bob's signature> |
| | SIGHASH flag | | SIGHASH_ALL |
| | Sequence number | | |
| Number of outputs | | | 1 |
| Output (locking) | Value | | *Few satoshis* |
| | Length of public key script | | |
| | Public key script | | OP_IF<br>OP_HASH160 <hash160(*X*)> OP_EQUALVERIFY<br>OP_HASH160 <hash160(redeem script)> OP_EQUAL<br>OP_ELSE<br>OP_2 <Alice's public key> <Bob's public key><br>OP_2 OP_CHECKMULTISIG<br>OP_ENDIF |
| Locktime | | | |

| | |
|---|---|
| Redeem script | OP_1 <metadata(reference ticket1)> <metadata(reference ticket2)> <Alice's public key> OP_2 OP_CHECKMULTISIG |

| | |
|---|---|
| Unlocking script | <Alice's signature> <redeem script> <*X*> OP_1 |

| | |
|---|---|
| Unlocking script | <Alice's signature> <Bob's signature> OP_0 |

Figure 3

| | | | |
|---|---|---|---|
| Transaction identifier | | | Tx2 |
| Version number | | | |
| Number of inputs | | | 1 |
| Input (unlocking) | Previous transaction | Hash | Tx1 |
| | | Output index | 0 |
| | Length of signature script | | |
| | Signature script | | <Alice’s signature> <Bob’s signature> |
| | SIGHASH flag | | SIGHASH_ALL |
| | Sequence number | | |
| Number of outputs | | | 1 |
| Output (locking) | Value | | *2BTC* |
| | Length of public key script | | |
| | Public key script | | OP_DUP OP_HASH160 <hash160(Alice’s public key)> OP_EQUAL OP_CHECKSIG |
| Locktime | | | 48 hours |

Figure 4

| | | | |
|---|---|---|---|
| Transaction identifier | | | Tx4 |
| Version number | | | |
| Number of inputs | | | 1 |
| Input (unlocking) | Previous transaction | Hash | Tx3 |
| | | Output index | 0 |
| | Length of signature script | | |
| | Signature script | | <Alice’s signature> <Bob’s signature> |
| | SIGHASH flag | | SIGHASH_ALL |
| | Sequence number | | |
| Number of outputs | | | 1 |
| Output (locking) | Value | | *Few satoshis* |
| | Length of public key script | | |
| | Public key script | | OP_DUP OP_HASH160 <hash160(Bob’s public key)> OP_EQUAL OP_CHECKSIG |
| Locktime | | | 24 hour |

Figure 5

| | | | |
|---|---|---|---|
| Transaction identifier | | | TxR |
| Version number | | | |
| Number of inputs | | | 1 |
| Input (unlocking) | Previous transaction | Hash | Previous Tx |
| | | Output index | |
| | Length of signature script | | |
| | Signature script | | <Bob's signature> <Bob's public key> |
| | SIGHASH flag | | SIGHASH_ALL |
| | Sequence number | | |
| Number of outputs | | | 1 |
| Output (locking) | Value | | 2 |
| | Length of public key script | | |
| | Public key script | | OP_DUP OP_HASH160 <hash160(Alice's public key)> OP_EQUAL OP_CHECKSIG |
| Locktime | | | |

BLOCKCHAIN-IMPLEMENTED SYSTEM AND METHOD

This invention relates generally to distributed ledger technology (such as blockchain-related technologies), and in particular a solution for the secure transfer (and/or exchange) of an asset between parties. It may provide a secure peer-to-peer exchange method and/or system which is put into effect via a blockchain platform or protocol. This may or may not be the Bitcoin network. The invention is particularly suited for securely transmitting an asset, such as a digital or electronic asset, between parties where no prior relationship or trust exists.

In this document we use the term 'blockchain' for the sake of convenience and ease of reference because it is currently the most widely known term in this context. The term is used herein to include all forms of electronic, computer-based distributed ledgers, including consensus-based blockchains, alt-chains, sidechains and transaction-chain technologies, permissioned and un-permissioned ledgers, private or public ledgers, shared ledgers and variations thereof.

A blockchain is an electronic ledger which is implemented as a computer-based decentralised, distributed system made up of blocks which in turn are made up of transactions. Each transaction (Tx) includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations fall within the scope of the invention.

Blockchain technology is most widely known for the use of cryptocurrency implementation. However, in more recent times, digital entrepreneurs have begun exploring both the use of the cryptographic security system Bitcoin is based on, and the data that can be stored on the Blockchain, to implement new systems.

One area of current interest and research is the use of the blockchain for the implementation of "smart contracts". These are computer programs designed to automate the execution of the terms of a contract or agreement. Unlike a traditional contract which would be written in natural language, a smart contract is a machine executable program which comprises rules that can process inputs in order to produce results, which can then cause actions to be performed dependent upon those results.

Another area of blockchain-related interest is the use of 'tokens' (or 'coloured coins') to represent and transfer real-world entities via the blockchain. A potentially sensitive or secret item can be represented by the token, which has no discernable meaning or value. The token thus serves as an identifier that allows the real-world item to be referenced.

The present invention is defined in the appended claims.

The invention may provide a computer-implemented method and corresponding system. It may be described as a method for implementing or performing an operation via a blockchain. It may be described as a method for performing an exchange or a transfer of an asset via a blockchain. One or both of the assets may be a portion of cryptocurrency. Additionally or alternatively, one or both of the assets may be non-cryptocurrency, but may be any other kind of asset—e.g. physical or electronic or digital asset. It may be a tokenised asset.

The method may provide a computer-implemented method for controlling the transfer and/or exchange of at least one asset between a first user and a second user via a blockchain. The method may control how and when the asset(s) are transferred.

The method may comprise:

generating a first blockchain transaction comprising at least one first output, representing at least one first asset, redeemable by providing either: (i) unlocking data; or (ii) a cryptographic signature of the first user and a cryptographic signature of a second user, wherein the at least one first asset is exchanged for at least one second asset represented by at least one second output of a second blockchain transaction, the at least one second output redeemable by providing either: (i) the unlocking data; or (ii) the cryptographic signature of the first user and the cryptographic signature of the second user.

Redemption of at least one second output by providing the first unlocking data may make the first unlocking data available to redeem at least one first output.

The term "redemption" may mean spending (i.e. redeeming) an output contained within a blockchain transaction.

A mutually-assured transfer of assets via the blockchain is enabled by the above method, thereby providing the advantages of enabling secure transfer of those assets and an immutable record of the transfer to be created and maintained.

Thus, the invention may provide a mechanism whereby two parties can perform a secure exchange of assets via the blockchain even if there is no established trust between them. The invention uses cryptographic techniques, plus a time-lock mechanism which controls when mining of the transaction(s) can occur, plus the concept of "revealable" data to put this into effect. An inter-dependency between transactions is created which means that control of the asset transfers is enforced by inventive application of the blockchain protocol. Thus, the invention provides a more secure asset exchange solution for advantageous use between non-trusting parties.

Redemption of the first blockchain transaction by providing the cryptographic signature of the first user and the cryptographic signature of the second user may cause at least one first output to be returned to the first user.

This enables the first asset to be returned to the first user upon provision of both the first and second users' signatures, thereby providing the advantage of preventing loss to the first user.

The method may further comprise the step of generating a third blockchain transaction configured to enable redemption of at least one first output by providing the cryptographic signature of the first user and the cryptographic signature of the second user in response to elapse of a first locktime.

This provides a period of time within which the first user is prevented from redeeming the first output, thereby providing the advantage of preventing the first user from claiming the first output in addition to the second output within that period of time.

The third blockchain transaction may comprise an unlocking script comprising the cryptographic signature of the first user and the cryptographic signature of the second user.

This prevents third parties from claiming the first output, thereby providing the advantage of increasing the security of the method.

The step of generating the third blockchain transaction may comprise sending the third blockchain transaction in an incomplete state to the second user, the incomplete third blockchain transaction configured to receive the cryptographic signature of the second user prior to its return, in a complete state, to the first user.

This provides the advantage of providing a simple and secure mechanism for gathering the cryptographic signatures.

The first locktime may be greater than a second locktime associated with a fourth blockchain transaction, wherein the fourth blockchain transaction is configured to enable redemption of at least one second output by providing the cryptographic signature of the first user and the cryptographic signature of the second user in response to elapse of the second locktime.

This provides a buffering period of time equal to the difference between the first and second locktimes, within which the second user may redeem the first output but the first user may not submit the third blockchain transaction to the blockchain to redeem the first output, thereby disabling the first user from redeeming both the first and second outputs.

The unlocking data may comprise revealable data chosen by the first user, wherein the revealable data is unknown to the second user until redemption of the third blockchain transaction. The revealable data may be data which is (initially) secret, preferably known only to the first user, until the third blockchain transaction is spent. The revealable data may become public, or "revealed" by making it available on the blockchain by providing it in an unlocking script. This may be in order to unlock a locking script of the third transaction. The second user may then be able to see and use the revealable data and provide it to another locking script.

This provides the advantage of enabling a mutual trust to be created between the first and second users, wherein revelation of the revealable data enables the first user to redeem the second output and the second user to redeem the first output, while providing the further advantage that non-revelation of the revealable data allows the first and second users to regain their respective assets represented by the respective first and second transactions.

The unlocking data may further comprise the cryptographic signature of the second user.

This ensures that redemption of the first output requires a cryptographic signature of the second user, thereby providing the advantage of increasing the security of the method.

According to a second aspect of the present invention, there is provided a computer-implemented method for transferring an asset between a first user and a second user, the method comprising: generating a second blockchain transaction comprising at least one second output, representing at least one second asset, redeemable by providing either: (i) unlocking data; or (ii) a cryptographic signature of the first user and a cryptographic signature of a second user, wherein the at least one second asset is exchanged for at least one first asset represented by at least one first output of a first blockchain transaction, the at least one first output redeemable by providing either: (i) the first unlocking data; or (ii) the cryptographic signature of the first user and the cryptographic signature of the second user, wherein redemption of the second output by providing the first unlocking data makes the first unlocking data available to redeem the first output.

Redemption of the second blockchain transaction by providing the cryptographic signature of the first user and the cryptographic signature of the second user may cause the second output to be refunded to the second user.

This enables the second asset to be returned to the second user upon provision of both the first and second users' signatures, thereby providing the advantage of preventing loss to the second user.

The method may further comprise the step of generating a fourth blockchain transaction configured to enable redemption of at least one second output by providing the cryptographic signature of the first user and the cryptographic signature of the second user in response to elapse of a second locktime.

This provides a period of time within which the second user is prevented from redeeming the second output, thereby providing the advantage of preventing the second user from claiming the second output in addition to the first output within that period of time.

The fourth blockchain transaction may comprise an unlocking script comprising the cryptographic signature of the first user and the cryptographic signature of the second user.

The step of generating the fourth blockchain transaction may comprise sending the fourth blockchain transaction in an incomplete state to the first user, the incomplete fourth blockchain transaction configured to receive the cryptographic signature of the first user prior to its return, in a complete state, to the second user.

The method may further comprise the step of monitoring the third blockchain transaction on the blockchain.

This provides the advantage of enabling the second user to redeem the first output in a timely manner.

The method may further comprise the step of generating a fifth blockchain transaction comprising at least one third output, redeemable by providing the cryptographic signature of the first user, thereby returning at least one first output to the first user.

This enables a refund mechanism to be enacted on the blockchain, wherein the first asset is returned to the first user, thereby providing the advantage of increasing the user-friendliness of the method.

The method may further comprise the step of broadcasting the fifth blockchain transaction to the blockchain in response to a determination that the asset was not provided to the first user.

This provides the advantage of further reducing the likelihood of loss to the first user.

The fifth blockchain transaction may be sent to a third party, and the determination and broadcast may be performed by the third party.

This provides the further advantage of increasing the automation of the method.

FIG. 1 shows a blockchain transaction representing a first asset from a first user to a second user in return for a second asset;

FIG. 2 shows a tokenised blockchain transaction representing the second asset to be provided by a second user to a first user in return for the first asset;

FIG. 3 shows a blockchain transaction configured to potentially return an output of the transaction of FIG. 1 to the first user after a first locktime has elapsed;

FIG. 4 shows a blockchain transaction configured to potentially return an output of the transaction of FIG. 2 to the second user after a second locktime has elapsed;

FIG. 5 shows a blockchain transaction representing a return of the first asset to the first user.

Figure 6:
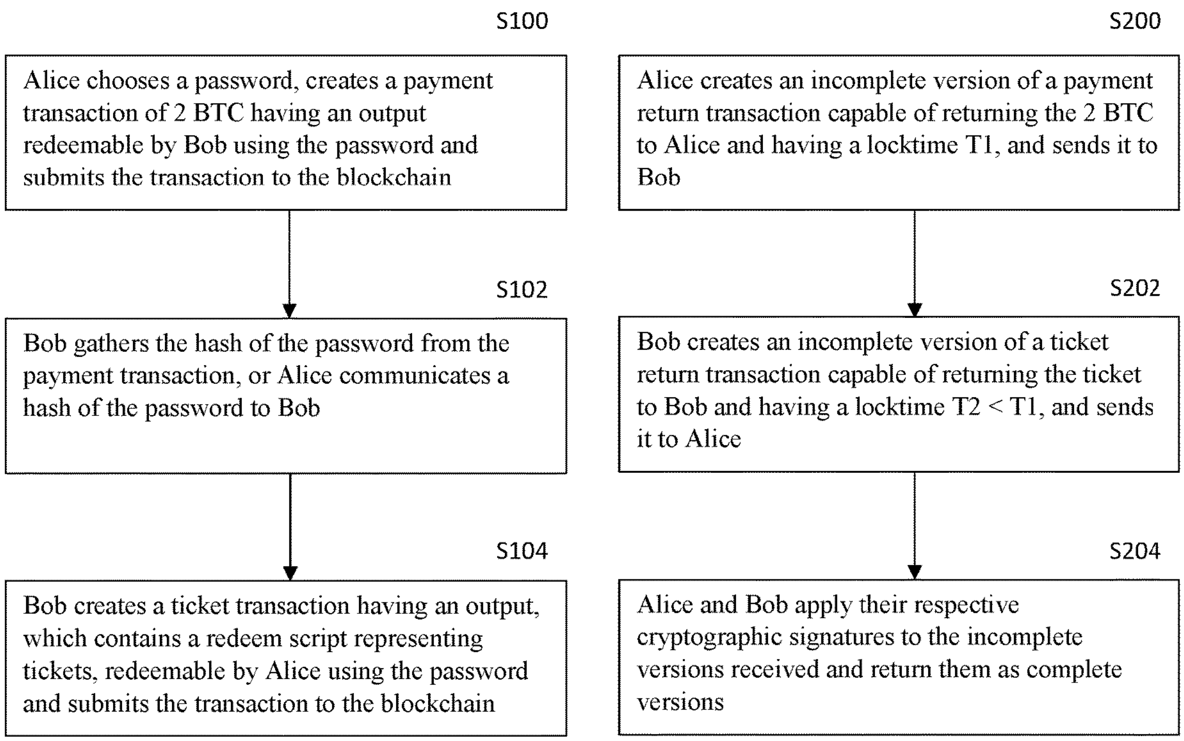
FIG. 6 shows a flowchart illustrating the steps taken by the first and second users.

We now provide an explanation of an embodiment of the invention, for the purpose illustration only. In this illustrative scenario, a method for transferring a second asset taking the form of event tickets in return for a first asset taking the form of payment, via the blockchain, is described. The use of the blockchain provides the inherent advantages provided by that technology. These advantages include a tamper proof record of events and increased security of currency exchange. Although this illustration relates to tickets, other types of assets may be transferred and still fall within the scope of the invention. The invention is not limited with regard to the type of asset concerned.

Alice is considering purchasing tickets for an event occurring sometime in the future. Bob is offering for sale tickets to the event in the form of tokenised blockchain transactions.

Referring to FIGS. 1 and 6, Alice generates a first blockchain transaction (S100) representing payment (in this illustrative embodiment, the payment is the 2 Bitcoins or 2 BTC, shown in the Value cell of FIG. 1) for a number of tickets she would like to purchase from Bob. From hereon this first blockchain transaction may be referred to as a payment transaction for clarity.

The payment transaction has an output which includes the following locking script:

```
OP_IF
    OP_HASH160 <hash160(X)> OP_EQUALVERIFY OP_DUP
    OP_HASH160 <hash160(Bob's public key)>
    OP_EQUALVERIFY OP_CHECKSIG
OP_ELSE
    OP_2 <Alice's public key> <Bob's public key>
    OP_2 OP_CHECKMULTISIG
OP_ENDIF.
```

The payment transaction may be unlocked by presentation to the payment transaction's locking script of either of the following unlocking scripts:

```
<Bob's signature> <Bob's public key> <X> OP_1
<Alice's signature> <Bob's signature> OP_0
```

Where X comprises data in a form useable in a blockchain transaction, chosen by Alice and used to secure the payment transaction. X may be the digitised version of biometric information, such as a fingerprint or an iris. X may contain randomly or pseudo-randomly generated data. The contents of unlocking script <Bob's signature> <Bob's public key> <x> above, which include X, may be referred to as "unlocking data". The unlocking data may include Bob's signature and Bob's public key, or it may only include data X, or it may include any appropriate combination thereof. In this illustrative embodiment, the unlocking data contains Bob's signature, Bob's public key, and X, which is a password chosen by Alice. From hereon, X may be referred to "revealable data".

The 2 BTC may be redeemed by provision of either: Bob's cryptographic signature, Bob's public key, and X; or Alice's cryptographic signature and Bob's cryptographic signature. (Note that the first data element (OP_0, OP_1) selects which phase is being used. If the top stack value is not 0, the IF statement is executed, and the top stack value is removed.)

Alice submits the payment transaction for verification and broadcast to the blockchain. Bob may monitor the blockchain for the payment transaction, and read from the payment transaction the hash of X (S102). Alice may additionally communicate the hash of X, and/or other information about the payment transaction, to Bob by any suitable means, such as via email or text message (S102).

Referring to FIGS. 2 and 6, Bob generates a second blockchain transaction (S104), representing the tickets Alice would like to purchase, to be transferred to Alice upon payment. The number and type of tickets Alice would like to purchase may have been communicated to Bob by any appropriate means, such as via email, via an app on a mobile device or PC etc, an online store, or transaction metadata embedded in a prior blockchain transaction, before Bob generates the second blockchain transaction representing those tickets. From hereon, this second blockchain transaction may be referred to as a "ticket transaction" for clarity.

The ticket transaction has an output which includes the following locking script:

```
OP_IF
    OP_HASH160 <hash160(X)> OP_EQUALVERIFY
    OP_HASH160 <hash160(redeem script)> OP_EQUAL
OP_ELSE
    OP_2 <Alice's public key> <Bob's public key>
    OP_2 OP_CHECKMULTISIG
OP_ENDIF.
```

In the above locking script, the redeem script is:

```
OP_1 <metadata(reference ticket1)> <metadata(reference
ticket2)> <Alice's public key> OP_2 OP_CHECKMULTISIG.
```

The ticket transaction may be unlocked by presentation to the ticket transaction's locking script of either of the following unlocking scripts:

```
<Alice's signature> <redeem script> <X> OP_1
<Alice's signature> <Bob's signature> OP_0
```

Where X is the password chosen by Alice, kept secret by Alice until she provides it to the locking script of the ticket transaction in order to redeem the tickets, and the redeem script is given above. In other words, the tickets may be redeemed by provision of either: Alice's cryptographic signature, the redeem script (containing Alice's public key), and X; or Alice's cryptographic signature and Bob's cryptographic signature.

Bob submits the ticket transaction for verification and broadcast to the blockchain. Alice may monitor the blockchain for the ticket transaction. Bob may additionally communicate information about the ticket transaction to Alice by any suitable means, such as via email or text message.

Referring to FIGS. 3 and 6, Alice also generates a third blockchain transaction (S200) (from hereon, this transaction may be referred to as the payment return transaction) configured to enable redemption of the 2 BTC of the payment transaction by providing to the payment transaction's locking script both Alice's signature and Bob's signature. Alice configures this transaction to have a locktime of 48 hours. This means that the transaction can be validated by the first node that receives it, and the transaction can be added to the memory pool. However, the transaction cannot be mined by miners, and therefore cannot be added to the blockchain, until the amount of time (in this illustrative example, a period of 48 hours) defined by the locktime has passed.

In order to generate the payment return transaction, Bob must provide his signature to create the transaction's unlocking script. To effect this, Alice may generate an incomplete version of the payment return transaction not containing Bob's signature and send it to Bob, who subsequently provides his signature (S204) to the incomplete transaction's locking script and returns the completed version of the payment return transaction to Alice.

Referring to FIGS. 4 and 6, Bob also generates a fourth blockchain transaction (S202) (from hereon, this transaction may be referred to as the "ticket return transaction") configured to enable redemption of the tokenised output of the ticket transaction by providing to the ticket transaction's locking script both Alice's signature and Bob's signature. Bob configures this transaction to have a lock time of 24 hours. This means that the transaction can be validated by the first node that receives it, and the transaction can be added to the memory pool. However, the transaction cannot be mined by miners, and therefore cannot be added to the blockchain, until the amount of time (in this illustrative example, a period of 24 hours) defined by the locktime has passed. It is to be understood that, while the above locktimes are chosen to be 48 hours and 24 hours, any suitable locktimes may be chosen, though it is advantageous for the payment return transaction's locktime to be greater than the ticket return transaction's locktime for reasons that will be described later in the application.

In order to generate the payment return transaction, Alice must provide her signature to create the transaction's unlocking script. To effect this, Bob may generate an incomplete version of the ticket return transaction not containing Alice's signature and send it to Alice, who subsequently provides her signature (S204) to the incomplete transaction's locking script and returns the completed version of the payment return transaction to Bob.

Once the payment transaction and the ticket transaction have been added to the blockchain, Alice has the choice of providing her signature, public key, and X to the locking script of the ticket transaction in order to redeem the tickets. In so doing, Alice necessarily makes X public—X is disclosed on the blockchain as a requirement of unlocking the ticket transaction. Once Bob gains knowledge of X, Bob is able to provide his signature, his public key, and X to the locking script of the payment transaction in order to redeem payment for the tickets.

Alice has until the elapse of the ticket return transaction locktime to provide X, after which time Bob is able to provide his signature to the locking script of the ticket return transaction and have the ticket return transaction added to the blockchain, which causes Alice's signature and Bob's signature to be provided to the locking script of the ticket transaction, thereby returning the tokenised output of the ticket transaction to Bob.

Alice then may wait until the elapse of the payment return transaction locktime to provide her signature to the locking script of the payment return transaction and have the payment return transaction added to the blockchain, which causes Alice's signature and Bob's signature to be provided to the locking script of the payment transaction, thereby returning the 2 BTC of the payment transaction to Alice.

If Alice provides X before the ticket return transaction locktime elapses, Bob has until the elapse of the payment return transaction locktime to provide X to the locking script of the payment transaction to claim his 2 BTC payment for the tickets Alice has redeemed. If Bob fails to claim the 2 BTC before this locktime elapses, then once the locktime has elapsed, Alice is able to sign the payment return transaction and regain her 2 BTC.

The payment return transaction locktime is chosen to be greater than the ticket return transaction locktime to grant Bob a reasonable minimum amount of time to claim his payment from the moment Alice claims the tickets. The minimum time is equal to the difference between the two locktimes. In this illustrative example, this minimum time is therefore 24 hours.

Referring to FIG. 5, Bob generates a fifth blockchain transaction, hereafter referred to as a refund transaction, representing a refund of Alice's 2 BTC to Alice. Bob may do this if the event for which the tickets were purchased is cancelled, or if Alice decides she would like to return the tickets for a refund, or for any other appropriate reason. Bob sends the refund transaction to a third party, such as a third user of the blockchain or an independent service provider which provides mediation services of this type. The third party may monitor the circumstances of the exchange and/or the event, and may determine whether the event has occurred as planned or not, examples of the latter including cancellation of the event, and returns the 2 BTC to Alice upon making a determination that the event was cancelled.

The third party may be instructed or configured to execute the refund (by publishing the refund transaction to the blockchain) for any other appropriate reason. Legitimate reasons, i.e. those that would satisfy Bob and/or the third party as legitimate criteria for refunding the 2 BTC to Alice, may be stipulated in terms and conditions of the exchange, which may be communicated between Alice, Bob, and the third party prior to the exchange, the terms and conditions possibly being stored on the blockchain in the form of a tokenised contract, or stored on an internet-connected resource.

The invention claimed is:

1. A computer-implemented method of a computer-based system for transferring an asset between a first user and a second user via a blockchain, the computer-implemented method comprising:

generating, by a processor of the computer-based system, a first blockchain transaction comprising at least one first output, representing at least one first asset, wherein the at least one first output is locked by a first locking script comprising a hash of secret data chosen by the first user and is redeemable by providing, in a first unlocking script, unlocking data comprising the secret data provided by the first user, wherein the at least one first asset is exchanged for at least one second asset represented by at least one second output of a second blockchain transaction, the at least one second output locked by a second locking script comprising the hash of the secret data and redeemable by providing, in a second unlocking script, the unlocking data comprising the secret data provided by the first user, wherein the at least one second output is redeemed by providing the unlocking data to the second blockchain transaction and submitting the second blockchain transaction to the blockchain which makes the unlocking data available to the second user to redeem the at least one first output;

generating, by the processor of the computer-based system, a third blockchain transaction that enables redemption of the at least one first output by providing a cryptographic signature of the first user and a cryptographic signature of the second user;

enabling, by the processor of the computer-based system, a redemption of the at least one first output in response to elapse of a first locktime, wherein the first locktime is greater than a second locktime associated with a fourth blockchain transaction, wherein the fourth blockchain transaction enables redemption of the at least one second output by providing the cryptographic signature of the first user and the cryptographic signature of the second user in response to elapse of the second locktime; and enacting, by the processor of the computer-based system, in response to the redemption, a refund mechanism on the blockchain to cause the first asset to be returned to the first user.

2. The computer-implemented method according to claim 1, wherein the third blockchain transaction comprises an unlocking script comprising the cryptographic signature of the first user and the cryptographic signature of the second user.

3. The computer-implemented method according to claim 1, wherein generating the third blockchain transaction comprises sending the third blockchain transaction in an incomplete state to the second user, wherein the incomplete state of the third blockchain transaction receives the cryptographic signature of the second user prior to returning the third blockchain transaction, in a complete state, to the first user.

4. The computer-implemented method according to claim 1, wherein the unlocking data comprises revealable data chosen by the first user, wherein the revealable data is unknown to the second user until the redemption of the at least one first output via the third blockchain transaction.

5. The computer-implemented method according to claim 1, wherein the unlocking data further comprises the cryptographic signature of the second user.

6. A computer-implemented method of a computer-based system for transferring an asset between a first user and a second user, the computer-implemented method comprising:

generating, by a processor of the computer-based system, a second blockchain transaction comprising at least one second output, representing at least one second asset, wherein the at least one second output is locked by a second locking script comprising a hash of a secret data chosen by the first user and is redeemable by providing, in a second unlocking script, unlocking data comprising the secret data provided by the first user, wherein the at least one second asset is exchanged for at least one first asset represented by at least one first output of a first blockchain transaction, the at least one first output locked by a first locking script comprising a hash of secret data chosen by the first user and redeemable by providing, in a first unlocking script, the unlocking data comprising the secret data provided by the first user, wherein the at least one second output is redeemed by providing the unlocking data to the second blockchain transaction and submitting the second blockchain transaction to the blockchain which makes the unlocking data available to the second user to redeem the at least one first output;

generating, by the processor of the computer-based system, a third blockchain transaction that enables redemption of the at least one second output by providing a cryptographic signature of the first user and a cryptographic signature of the second user;

enabling, by the processor of the computer-based system, a redemption of the at least one second output in response to elapse of a first locktime, wherein the first locktime is greater than a second locktime associated with a fourth blockchain transaction, wherein the fourth blockchain transaction enables redemption of the at least one second output by providing the cryptographic signature of the first user and the cryptographic signature of the second user in response to elapse of the second locktime; and enacting, by the processor of the computer-based system, in response to the redemption, a refund mechanism on the blockchain to cause the second asset to be returned to the second user.

7. The computer-implemented method according to claim 6, wherein the fourth blockchain transaction comprises an unlocking script comprising the cryptographic signature of the first user and the cryptographic signature of the second user.

8. The computer-implemented method according to claim 6, wherein the step of generating the fourth blockchain transaction comprises sending the fourth blockchain transaction in an incomplete state to the first user, wherein the incomplete state of the fourth blockchain transaction receives the cryptographic signature of the first user prior to returning the fourth blockchain transaction, in a complete state, to the second user.

9. The computer-implemented method according to claim 6, further comprising monitoring the third blockchain transaction on the blockchain.

10. The computer-implemented method according to claim 6, further comprising generating a fifth blockchain transaction comprising at least one third output, redeemable by providing the cryptographic signature of the first user, thereby returning the at least one first output to the first user.

11. The computer-implemented method according to claim 10, further comprising broadcasting the fifth blockchain transaction to the blockchain in response to a determination that the asset was not provided to the first user.

12. The computer-implemented method according to claim 11, wherein the fifth blockchain transaction is sent to a third party, and wherein the determination and the broadcasting are performed by the third party.

* * * * *